Patented May 26, 1942

2,284,282

UNITED STATES PATENT OFFICE 2,284,282

MENAPHTHYL CELLULOSE DERIVATIVES

Winfrid Hentrich, Dusseldorf - Reisholz, and Rudolf Köhler, Dusseldorf, Germany, assignors, by mesne assignments, to The Procter & Gamble Company, Cincinnati, Ohio, a corporation of Ohio No Drawing. Application August 20, 1938, Serial No. 225,938. In Germany August 31, 1937

3 Claims. (Cl. 260—231)

This invention relates to new cellulose ethers and methods of producing the same. More particularly it relates to certain cellulose ethers of wide technical use which are soluble in organic solvents, particularly in hydrocarbons.

Numerous esters and ethers of cellulose are already known which are soluble in organic solvents; however, only a small number of them such as methyl, ethyl, or benzyl cellulose are soluble in hydrocarbons. The manufacture of methyl or ethyl cellulose is difficult technically because the process is successful only when the cellulose is repeatedly alkylated in the presence of a large excess of the alkylating agent. Cellulose products obtained by benzylation are generally soluble only in mixtures of aromatic hydrocarbons and oxygen-containing solvents, such as alcohol.

An object of the present invention is to produce a group of cellulose ethers by a process which is easily carried out to produce a high yield of the desired products. Another object is to produce cellulose ethers which on account of their ready solubility in cheap organic solvents may be used with considerable advantage in many arts. Yet another object is to produce a new class of cellulose ethers having somewhat different properties from ordinary cellulose ethers rendering them specially suitable for certain fields of use.

In accordance with the instant invention it has been found that cellulose ethers which are completely soluble in hydrocarbons are obtained in a simple manner if cellulose is reacted with hydrogenation products of chlormethyl-naphthalene, such, for example, as chlormethyl-tetrahydronaphthalene, the reaction preferably being effected in the presence of acid-binding agents. In this process for example, alkalies, such as caustic soda, caustic potash, and tetraalkyl-ammonium hydroxides; or nitrogen compounds, such as pyridine, and quinoline, all of which are strong alkaline-reacting acid-binding agents may be used as acid-binding agents.

The cellulosic component applicable in the instant process may be cellulose including modified cellulose products of the nature of the various cellulose materials which are now employed for the manufacture of cellulose esters or cellulose ethers, such as natural cellulose, sulfite cellulose and other like products. If the reaction is to be conducted in the presence of caustic soda, it is desirable to prepare soda-cellulose as a preliminary step by any of the methods already known and then to react it with chlormethyl-naphthalene hydrogenation products.

The new cellulose ethers prepared in accordance with the method of the instant invention may be obtained either in the form of a granular powder or in the form of a fibrous mass, the form depending directly upon the manufacturing conditions. If slightly concentrated, they form viscous solutions which dry into clear solid films which are outstanding in quality with respect to their minimal electric conductivity. The new cellulose ethers are suitable for use in most varied branches of the arts, especially in connection with the manufacture of lacquers, films, coating compositions, artificial fiber materials, fabricated articles of many kinds, insulators and insulation materials, and for the manufacture of many other products. One particularly advantageous use of the new cellulose ethers lies in the spinning of threads, which use is possible because of the readiness and cheapness with which solutions of the ethers are obtained.

Example

Five parts of sulfite cellulose are dipped into a 33% solution of caustic soda and the excess liquid squeezed off with the result that 15 parts of cellulose saturated with caustic soda are obtained. The alkali cellulose thus prepared is worked to separate the fibers, and is introduced into a vessel provided with a stirring means and a heating means, together with 50 parts of Ar - chlormethyl - tetrahydronaphthalene. This mixture is stirred for 16 hours at 115°–120° C. The cellulose, which is fibrous when the process commences, changes during the treatment to a thick, viscous mass. The reaction product, upon cooling, is repeatedly mixed with methanol in order to extract the unconverted chlormethyl-tetrahydronaphthalene. The common salt liberated during the reaction separates out in the methanol. A brittle reaction product is obtained upon removal of the methanol solution, which product may be subsequently dried and broken up or ground to a powder. The tetrahydro-menaphthyl cellulose thus obtained is readily soluble in benzene.

The treatment of the cellulose with chlormethyl-tetrahydronaphthalene described may be repeated once or several times. By repeating the treatment, products are obtained which are even more readily soluble. Instead of the hydrogenated chlormethyl-naphthalene above referred to, there may also be used the corresponding hydrogenated halogenmethyl-naphthalenes e. g. hydrogenated bromomethyl-naphthalene, and hydrogenated iodomethyl-naphthalene.

The naphthalene derivatives used as starting material according to the present invention may contain the halogen methyl group in the alpha or beta position.

We wish it to be understood that the invention is not restricted to the illustrative examples herein given but that it extends to processes and products which may be considered fairly within the purview of our invention as described in the specification, and within the scope of the terms of the appended claims.

We claim:

1. As a new compound, tetrahydro-menaphthyl cellulose.

2. The process of producing tetrahydro-menaphthyl cellulose comprising reacting sodacellulose with chlormethyl-tetrahydronaphthalene at an elevated temperature at which etherification occurs.

3. Hydrogenated menaphthyl cellulose having four additional hydrogen atoms in its aromatic nucleus, said hydrogenated menaphthyl cellulose being soluble in benzene.

WINFRID HENTRICH.
RUDOLF KÖHLER.